United States Patent [19]

Bhateja et al.

[11] 3,999,817
[45] Dec. 28, 1976

[54] SEPARATOR RING FOR RETAINING ROLLERS IN A THRUST BEARING

[75] Inventors: Chander Prakash Bhateja, Harwinton; Richard Lassen Alling, Torrington; Dean Edward Johnston, Thomaston, all of Conn.

[73] Assignee: The Torrington Company, Torrington, Conn.

[22] Filed: Jan. 30, 1976

[21] Appl. No.: 653,959

[52] U.S. Cl. .............................................. 308/235
[51] Int. Cl.$^2$ ...................................... F16C 33/38
[58] Field of Search ................... 308/217, 235, 231

[56] References Cited
UNITED STATES PATENTS

| | | | |
|---|---|---|---|
| 1,494,392 | 5/1924 | VanLoozen | 308/235 |
| 2,011,878 | 8/1935 | Sjobring | 308/217 X |
| 2,052,292 | 8/1936 | Hartmann | 308/217 |
| 2,959,458 | 11/1960 | Kaye | 308/231 |

Primary Examiner—Joseph F. Peters
Assistant Examiner—Gene A. Church
Attorney, Agent, or Firm—Frank S. Troidl

[57] ABSTRACT

The separator ring to be used with thrust bearings is an annular member with a plurality of circumferentially separated roller engaging portions. The rollers have outer ends constructed to mate with the roller end engaging portions of the annular member. The roller engaging portions on the annular member may be protrusions extending radially inwardly toward the axis of the bearing with the rollers having depressions on the outer ends for receiving the protrusions or alternatively, the roller engaging portions may be radially outwardly extending depressions with the rollers having outer surfaces which fit into the depressions.

5 Claims, 7 Drawing Figures

U.S. Patent  Dec. 28, 1976  3,999,817
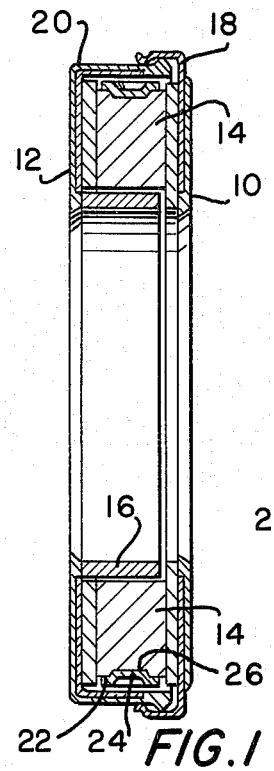
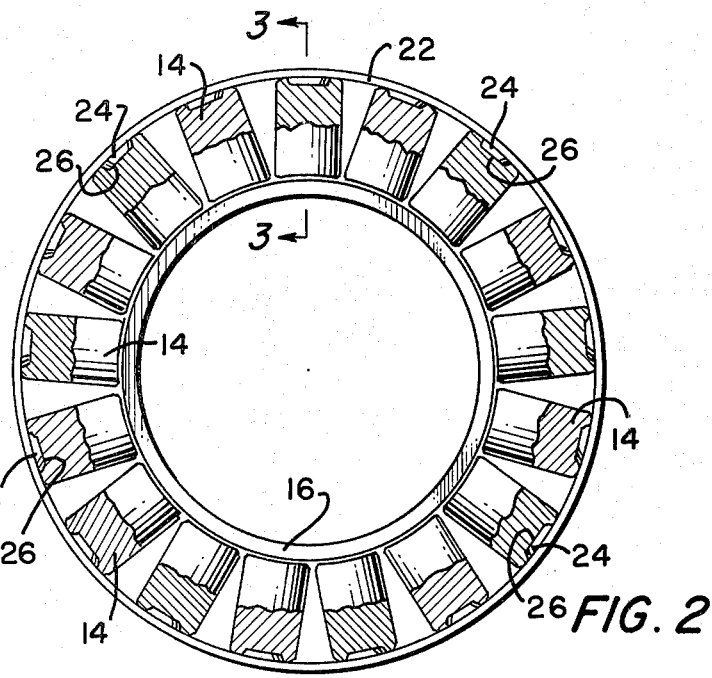
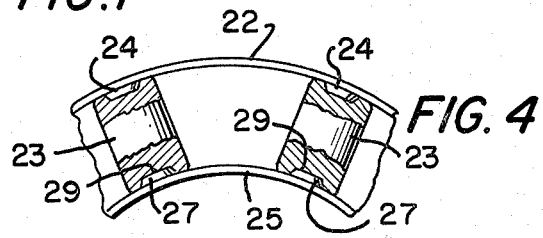
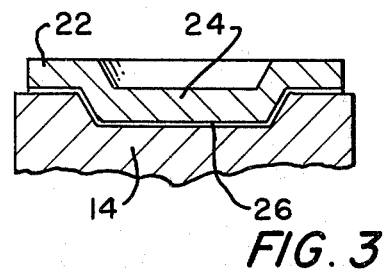
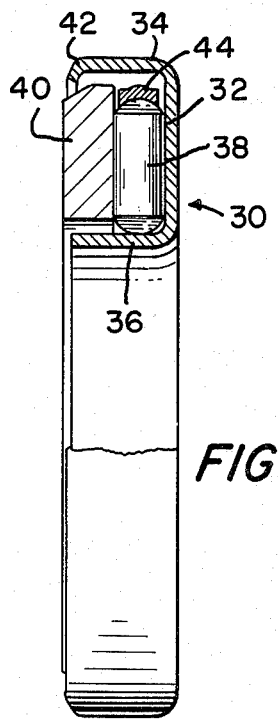
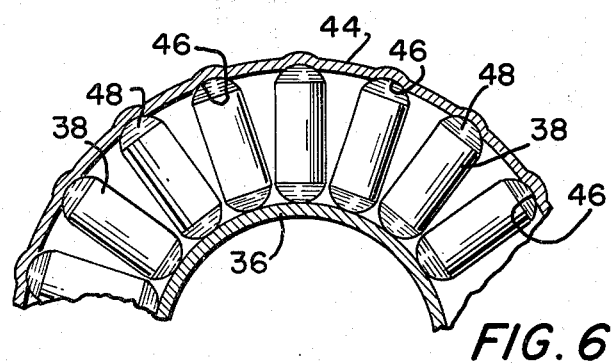
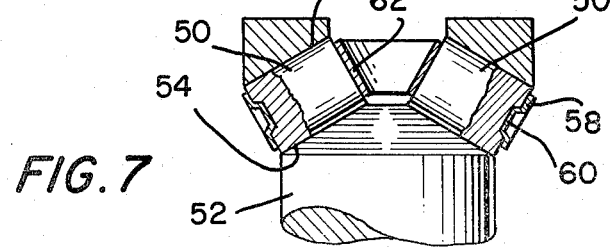
FIG. 1
FIG. 2
FIG. 3
FIG. 4
FIG. 5
FIG. 6
FIG. 7

SEPARATOR RING FOR RETAINING ROLLERS IN A THRUST BEARING

This invention relates to thrust bearings. More particularly, this invention is a new roller separator for use in a thrust bearing with rollers.

In certain applications, the overall size of the bearing is limited to a predetermined size because of space limitations in mounting the bearing. In such applications where it is desired to have the bearing transmit a maximum load, it is necessary to provide the bearing with the maximum number of antifriction rollers.

In U.S. Pat. No. 2,959,458 issued Nov. 8, 1960, to H. E. Kaye, there is shown a thrust bearing with a structure which is designed to maximize the number of cylindrical antifriction rollers which can be used in a thrust bearing with a predetermined size. However, the annular retaining member used in the Kaye patent includes wedge shaped portions which extend along the periphery of the rollers. Such a wedge arrangement creates undue rubbing contact and abrasion between the retainer and roller and wipes away lubricant from the roller surface. The wedges also occupy space between the rollers, which space might better be used to hold a larger supply of lubricant for increased bearing life.

This invention provides a separator which permits the use of a maximum number of cylindrical rollers for a predetermined thrust bearing size. The rubbing contact speed between the separator and the rollers is reduced, and the wiping away of lubricant from the rolling-contact surfaces by the separator is eliminated. The separator ring circumferentially spaces the outer ends of the rollers in the bearing. The inner ends of the rollers of the full-complement thrust bearing, the bearing with the maximum number of rollers, are closely adjacent to one another.

However, the same bearing can also be used with a partial complement of rollers in thrust bearing applications where the thrust loads are lighter. The inner ends of the rollers do not need to be adjacent to one another so long as the radial space in the bearing is too small to allow the roller to escape from the projection on the separator ring during handling and shipping; and in those conditions of service where a roller becomes unloaded. Our preferred minimum number of rollers is three, angularly spaced apart so that the rollers help to keep the outer separator ring and the inner containment ring in their relative concentric positions. These spaced apart rollers leave an even greater storage space for lubricant than do the rollers in the full complement bearings, again resulting in longer life of the bearing.

Briefly described, the invention is an annular member used as a separator in a thrust bearing. The annular member has a plurality of circumferentially separated protrusions or alternatively, recessions, and the antifriction rollers are provided with an outer end constructed to mate with the protrusions or recessions. Because the contact of the separator with the roller is closer to the roller axis, than is the case with the separator shown in the Kaye U.S. Pat. No. 2,959,458 where the contact is between a wedge-shaped separating bar and the outer periphery of the roller, the rubbing contact speed between our separator and roller is much lower than the rubbing contact speed between the separator and the rollers of Kaye. Friction and abrasion are reduced.

Also, by contacting the rollers at the ends only, the separator ring does not wipe lubricant film off the rollers or races in critical rolling load contact zones.

The invention as well as its many advantages may be further understood by reference to the following detailed description and drawings in which:

FIG. 1 is a sectional view illustrating the invention used with a sealed thrust bearing;

FIG. 2 is an elevational view partly in section showing the annular separator, rollers, and containment ring of FIG. 1;

FIG. 3 is a sectional view on an enlarged scale taken generally along lines 3—3 of FIG. 2;

FIG. 4 is a fragmentary sectional view showing a partial complement of rollers;

FIG. 5 is a view, partly in section, illustrating a second preferred embodiment of my invention;

FIG. 6 is a sectional fragmentary view illustrating the arrangement of the rollers, separator, and inner guide member of FIG. 5.; and FIG. 7 is a sectional fragmentary view, illustrating the use of my invention in a conical bearing.

Like parts are referred to by like numbers in the various figures.

In the thrust bearing shown in FIG. 1, a first thrust plate 10 and an axially separated second thrust plate 12 are shown. A plurality of cylindrical rollers 14 are located in the annular space between thrust plates 10 and 12. The rollers are radially contained on the inside by an annular containment ring 16 which may be mounted upon a shaft (not shown). Lubricant is kept in the thrust bearing by means of a first annular seal 18 and a second annular seal 20. The bearing might also be sealed at its bore.

The new separator and roller arrangement of this invention is shown more clearly in FIG. 2 and FIG. 3. The annular separator ring 22 has a plurality of circumferentially separated protrusions 24. The protrusions 24 extend radially inwardly toward the axis of the thrust bearing and fit into recesses or depressions 26 located in the outer extremity of the rollers 14. If desired, hollow rollers may be substituted for rollers 14. The inner ends of the rollers 14 are spaced very closely together in order to fit a maximum number of rollers in the space between inner ring 16 and the separator 22. If desired, the protrusions 24 can be made longer than shown so the protrusions contact the bottom of recess 26, but the roller end itself does not contact ring 22.

Under some circumstances, the inner ring 16 need not be used. The rollers will track around properly without the inner ring if the bearing rollers are uniformly loaded. The inner ring keeps the rollers in place when the rollers are unloaded such as in shipping or handling or in service when there is an eccentric load on the bearing so that the rollers become intermittently unloaded and without the inner containment ring would be free to move away from their piloting projections on the outer separator ring.

It can be seen that with this structure, a maximum number of antifriction cylindrical rollers is positioned between the inner ring 16 and the separator ring 22 whereby a construction is achieved having the maximum load capacity for a given size cylindrical roller thrust bearing. Also, since the contact area between the protrusion 24 and the recess 26 of rollers 14 is close to the roller axis, the rubbing contact speed between the separator and the roller is reduced.

The radial space between the separator 22 and the inner containment ring 16 must be small enough so that the inner end of the roller cannot pivot and the roller cannot drop out of position, and yet there must be running clearance between the ends of the rollers and the rings. The radial space between the rings, therefore, must be greater than the axial roller length but less than the diagonal roller length. The radial space may be greater than the roller diagonal length if an inner ring with projections is used in conjunction with the outer separator ring to keep the rollers in position when not under load. In this case, the inner ring would be provided with projections similar to these of the outer separator, with these projections extending into the depressions in the inner ends of the rollers.

A preferred method of making the separator ring is to take a narrow strip of steel, emboss the protrusions on it, and then wrap up and weld the circular ring. The ring might also be made by various other methods and of other materials, such as machining or pressing from a solid ring or die casting metal, or molding synthetic resin, or forming a strip from synthetic resin and fastening the ends together.

In FIG. 4 the same separator as shown in FIGS. 1 through 3 is used with a partial complement of rollers 23. The partial complement of rollers may be used where the bearing thrust loads are relatively light. The inner ends of the rollers 23 do not need to be adjacent to one another so long as the radial space in the bearing is too small to allow the rollers to escape from the projections 24 on the separator ring 22.

The embodiment of FIG. 4 also includes an inner guide ring 25 provided with radially outwardly extending projections 27 which extend into recesses 29 in the inner ends of rollers 23. If desired, rollers with only outer recesses can be used with either the partial complement of rollers or the full complement of rollers with an inner containment ring without projections; also, if desired, rollers with both inner recesses and outer recesses or rollers hollow all the way through and an inner guide ring having radially outwardly extending projections may be used in the embodiment shown in FIGS. 1 through 3 in conjunction with the outer separator ring.

In the embodiment shown in FIG. 5 and FIG. 6, a first thrust member 30 is shown including an annular raceway 32, an outer flange 34, and an inner flange 36. The inner flange 36 serves to guide the inner ends of the spherical ended rollers 38. A second thrust plate 40 is kept in place by a radially inwardly extending annular portion 42 on the flange 34.

As shown more clearly in FIG. 6, the separator ring in this embodiment is a separator ring 44 having recesses 46 which extend radially outwardly from the axis of the bearing.

The spherical outer ends 48 of the spherical ended rollers 38 mate with the recesses 46 formed in the separator ring 44. Various shapes of recesses and roller end configurations may be used.

FIG. 7 shows the use of a separator ring in a conical thrust bearing with cylindrical rollers 50. The tapered end of the rotatable shaft 52 provides an inner raceway 54. An outer raceway 56 is also provided. The separator ring 58 includes a plurality of inwardly extending projections 60 which mate with recesses in the outer ends of cylindrical rollers 50. Projections 60 extend at an acute angle to the bearing axis in the direction of the roller axis. An inner ring 62 is also shown in FIG. 7. The inner ring would probably only be necessary with a partial complement conical thrust bearing and probably not be required for most types of full complement conical thrust bearings, except for roller containment for shipping and handling.

While we have described the separator ring as being used with cylindrical rollers in thrust bearings and conical bearings, the separator may also be used with tapered rollers and barrel-shaped rollers in both full complement and partial complement antifriction thrust bearings and conical bearings.

We claim:

1. For use in combination with a thrust bearing: an annular member consisting only of substantially concentric inner and outer walls and having a plurality of circumferentially separated roller end engaging portions on one of said walls; and a plurality of rollers having outer ends constructed to mate with the roller end engaging portions of the annular member, the roller length being greater than the thickness of said annular member.

2. An annular member in accordance with claim 1 wherein: the roller end engaging portions are radially, inwardly extending protrusions and the roller ends have depressions for receiving the protrusions.

3. An annular member in accordance with claim 1 wherein: the roller end engaging portions are radially, outwardly extending depressions, and the roller ends have outer surfaces fitting in the depressions.

4. For use in combination with a thrust bearing, an annular member consisting only of substantially concentric inner and outer walls and having a plurality of circumferentially separated roller end engaging portions on one of said walls; a plurality of rollers having outer ends constructed to mate with the roller end engaging portions of the annular member; the roller length being greater than the thickness of said annular member; and means for containing the inner ends of the rollers.

5. The combination of claim 4 wherein: the structure of the annular member and the structure of the containing member are such that a full annular space is provided between said two members; a roller is provided for each roller end engaging portion; and the inner ends of the rollers are spaced closely adjacent one another so that a maximum number of rollers are provided in said annular space.

* * * * *